US012431962B2

(12) United States Patent
Kimberly et al.

(10) Patent No.: US 12,431,962 B2
(45) Date of Patent: Sep. 30, 2025

(54) TOWED SENSOR TO AID LOW SWAP BACKUP COMMUNICATIONS

(71) Applicant: The Boeing Company, Arlington, VA (US)

(72) Inventors: Gregory Kimberly, Seattle, WA (US); Jae H. Kim, Bellevue, WA (US); John Dalton Williams, Decatur, AL (US)

(73) Assignee: The Boeing Company, Arlington, VA (US)

( * ) Notice: Subject to any disclaimer, the term of this patent is extended or adjusted under 35 U.S.C. 154(b) by 367 days.

(21) Appl. No.: 18/304,277

(22) Filed: Apr. 20, 2023

(65) Prior Publication Data

US 2024/0356628 A1    Oct. 24, 2024

(51) Int. Cl.
*H04B 7/00* (2006.01)
*B64U 10/14* (2023.01)
*H04B 7/185* (2006.01)
*B64U 101/20* (2023.01)

(52) U.S. Cl.
CPC ......... *H04B 7/18504* (2013.01); *B64U 10/14* (2023.01); *B64U 2101/20* (2023.01)

(58) Field of Classification Search
CPC ............... H04B 7/18504; B64U 10/14; B64U 2101/20; B64U 455/431
See application file for complete search history.

(56) References Cited

U.S. PATENT DOCUMENTS 7,673,831 B2 * 3/2010 Steele .................. F42B 12/365
                                                244/1 TD
11,335,009 B2 * 5/2022 Gauci ....................... G06T 7/90
11,634,237 B2 * 4/2023 Bosma ..................... B64D 1/06
                                                244/195
2020/0010193 A1 * 1/2020 Alexander ............ B64U 10/16
2021/0163132 A1 * 6/2021 Xu .................... G10K 11/17881

FOREIGN PATENT DOCUMENTS

WO    WO-2017222152 A1 * 12/2017  ....... G10K 11/17823

OTHER PUBLICATIONS

"SVELTE: Lightweight MAD Sensor Towing System for UAVs and Small Helicopters," Department of Defense, Contract No. N68335-08-C-0193, Award Year, 2008, accessed Mar. 10, 2023, 2 pages. https://www.sbir.gov/content/svelte-lightweight-mad-sensor-towing-system-uavs-and-small-helicopters-0.
Vilhelmsen et al., "Drone-towed CSEM system for near-surface geophysical prospecting: On instrument noise, temperature drift, transmission frequency and survey setup," Geoscientific Instrumentation, Methods and Data Systems, vol. 11, May 12, 2022, 32 pages.https://egusphere.copernicus.org/preprints/2022/egusphere-2022-217/egusphere-2022-217.pdf.

* cited by examiner

*Primary Examiner* — Khai M Nguyen
(74) *Attorney, Agent, or Firm* — Yee & Associates, P.C.

(57) ABSTRACT

A secondary communication system for an unmanned aerial vehicle (UAV) is provided. The secondary communication system comprises at least one motor on the UAV and a motor controller in each motor that generates a signal from noise generated by the motor. A connector is configured to connect a towed sensor assembly to the UAV. A sensor acts as a receiver for the UAV, wherein the sensor receives a signal from a transmission source other than the UAV. The sensor is towed on the connector at a distance from the UAV sufficient to prevent or minimize interference of the received signal by the noise generated by the motor.

20 Claims, 6 Drawing Sheets

TOWED SENSOR TO AID LOW SWAP BACKUP COMMUNICATIONS

BACKGROUND INFORMATION

1. Field

The present disclosure relates generally to communications systems, and more specifically to a secondary communications system based on noise generated by a UAV motor under RF jamming in contested environments.

2. Background

Unmanned aerial vehicles (UAVs) are aircraft that operate without a pilot onboard. They can be controlled remotely by a human operator or programmed to fly autonomously. UAVs may include fixed-wing and multirotor designs. The majority of power expended by certain UAVs, especially smaller ones, is spent driving their electric propulsion system. Such electric propulsion systems create output in the audio and magnetic domains.

The motors on a UAV can generate interference in both audio and magnetic domains that can cause problems for that UAV in receiving signals. Listening to a magnetic or audio signal coming from another platform or ground station can be difficult for the UAV when its own motors are creating a local signal of their own.

Existing approaches to providing backup communications are power and weight intensive. Audio sensors might be positioned to be less sensitive to host audio signals, but magnetic sensors are more challenging to situate on the platform.

Therefore, it would be desirable to have a method and apparatus that takes into account at least some of the issues discussed above, as well as other possible issues.

SUMMARY

An illustrative embodiment provides a towed sensor assembly. The towed sensor assembly comprises a connector configured to connect the towed sensor assembly to an unmanned aerial vehicle (UAV) and a sensor that acts as a receiver for the UAV. The sensor receives a signal from a transmission source other than the UAV, wherein the sensor is towed on the connector at a distance from the UAV sufficient to prevent or minimize interference of the received signal by noise generated by at least one motor on the UAV.

Another illustrative embodiment provides a secondary communication system for an unmanned aerial vehicle (UAV). The secondary communication system comprises at least one motor on the UAV and a motor controller in each of the at least one motor that generates a signal from noise generated by the at least one motor. A connector is configured to connect a towed sensor assembly to the UAV. A sensor acts as a receiver for the UAV, wherein the sensor receives a signal from a transmission source other than the UAV. The sensor is towed on the connector at a distance from the UAV sufficient to prevent or minimize interference of the received signal by the noise generated by the at least one motor.

Another illustrative embodiment provides a method of secondary communication for an unmanned aerial vehicle (UAV). The method comprises generating, by a motor controller in at least one motor of the UAV, a signal from noise generated by the at least one motor, wherein the noise generated by the at least one motor is magnetic or audio. A sensor towed by the UAV receives a signal from a transmission source other than the UAV. The sensor is towed at a distance from the UAV sufficient to prevent or minimize interference of the received signal by the noise generated by the at least one motor, wherein the received signal from the transmission source is magnetic or audio.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations as described herein. The illustrative embodiments recognize and take into account that the majority of power expended by an unmanned aerial vehicle (UAV) is spent driving its electric propulsion system. Such electric propulsion systems create output in the audio and magnetic domains.

The illustrative embodiments also recognize and take into account that audio and magnetic output can be modulated to support communications, with magnetic modulation allowing communications over longer distances than audio. Both of these modes require additional effort to jam relative to traditional radio frequency (RF) communication modes. Both of these modes can also supply communications capabilities when a primary communication system has failed.

The illustrative embodiments also recognize and take into account that in the presence of RF jamming in contested environments, some backup communications are required to share a critical control information even in an adversary's Anti-Access/Area Denial (A2AD) areas. One of the benefits of a UAV is power generated to drive its electric propulsion motors creates output in the audio and magnetic domains, whereby these outputs can be modulated to support communications over a range of distances and such that both outputs are difficult to jam relative to traditional radio frequency (RF)-based communications.

The illustrative embodiments provide a sensor (either audio or magnetic) towed at a distance from a UAV, thereby limiting interference from the UAV's motor(s). The sensor might weigh in the order of ounces, with an audio sensor weighing less than an ounce. The towed sensor can communicate to the host UAV via a wired connection or wireless connection. The towed sensor improves the ability to listen to signals from sources up to 100 m away while staying within the Size, Weight, and Power (SWAP) constraints of the host UAV. For example, the towed sensor might require less than 1 W of power and be less than four inches in diameter. By towing the sensor remotely, the illustrative embodiments leverage the physics of the signals to limit interference by the host UAV and missions.

The towed sensor, in conjunction with modulation of motor noise, provides a secondary communications system that can include standard communication schemes for conventional operation, communications, and control. The second communications system can also serve as a backup to a primary communication system, especially in contested environments.

Figure 1:
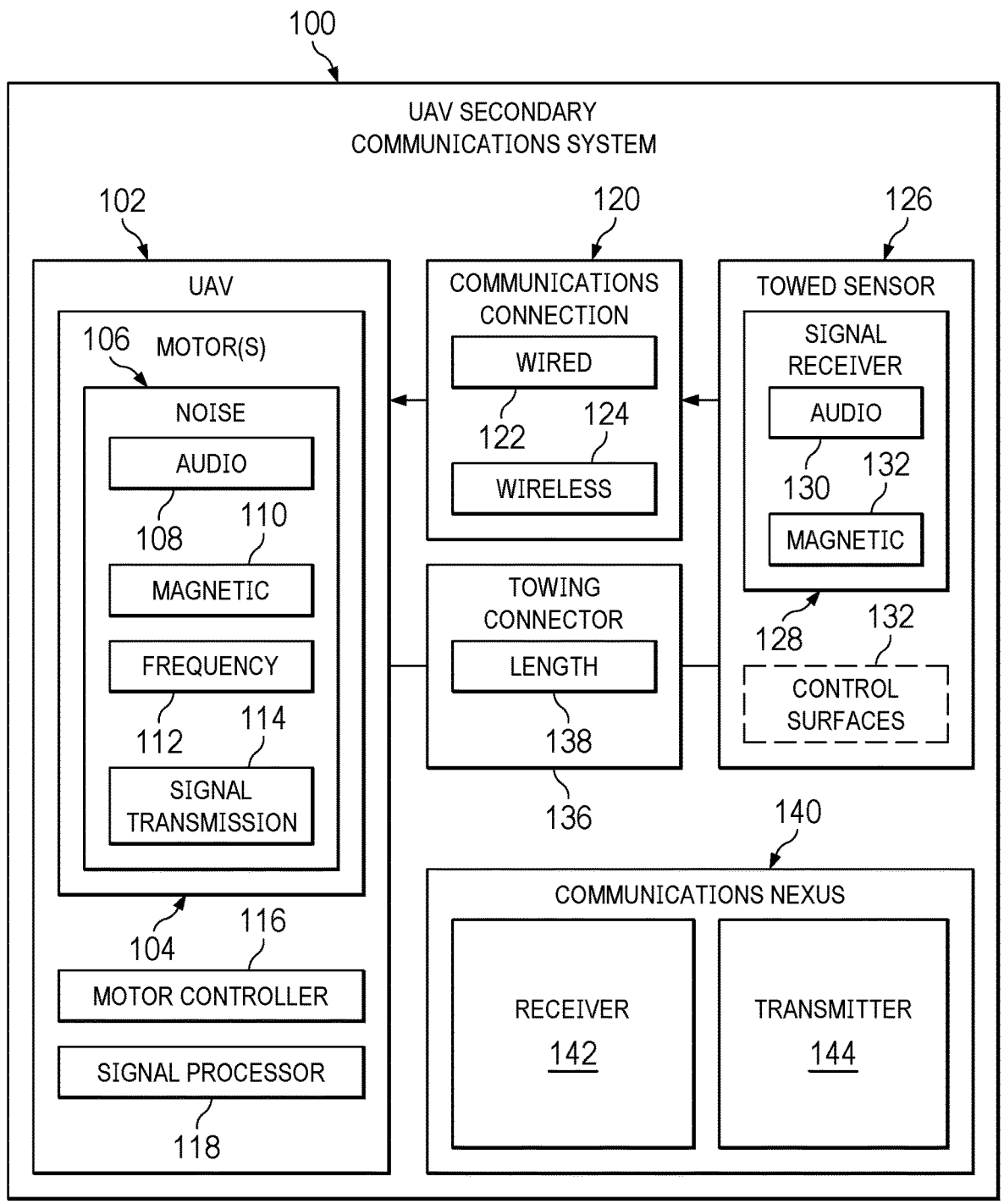
FIG. 1 depicts a block diagram of a UAV secondary communications system in accordance with an illustrative embodiment.

FIG. 1 depicts a block diagram of a UAV secondary communications system in accordance with an illustrative embodiment.

UAV secondary communications system 100. Comprises UAV 102, towed sensor 126, and communications nexus 140.

UAV 102 comprises at least one motor 104, which generates noise 106 during operation. UAV 102 might be an aerial drone including a multi-rotor (multi-copter) drone. Noise 106 might comprise audio 108 and/or magnetic 110 noise. Motor 104 also operates at a specific (audio and/or magnetic) frequency 112. If UAV 102 includes multiple motors, each motor might operate at a different, respective frequency 112 than the others, and the motors can be synchronized with each other. Motor controller 116 is configured to modulate motor(s) 104 such that noise 106 can be converted into a signal transmission 114 in either the audio or magnetic domain. As such, motor controller 116 is able to perform encoding of outgoing signals. Signal processor 118 decodes incoming signals received by towed sensor 126 and sent over communications connection 120. Motor controller 116 and signal processor 118 might be implemented as, e.g., single-board computers (SBCs), field-programmable gate arrays (FPGAs), or other advanced microprocessor elements.

Towed sensor 126 is connected to UAV 102 by towing connector 136 such as, e.g., a tether. Towing connector 136 has length 138 to keep towed sensor 126 at a distance from UAV 102 sufficient to prevent or minimize interference of any received signals by noise 106 generated by motor(s) 104 on the UAV.

Towed sensor 126 comprises a signal receiver 128 that is able to detect transmissions in the audio 130 and/or magnetic 132 domains. For example, for magnetic signal detection, signal receiver 128 might be a magnetometer such as a spin exchange relaxation free (SERF) magnetometer or other similarly sensitive sensor. Sensitivities of picoTesla instead of microTesla can be achieved within a volume 10,000 times smaller than a conventional inductive loop.

Towed sensor 126 might optionally include active control surfaces 134 for use during flight. Control surfaces 134 can stabilize the flight of towed sensor 126 to reduce stress on towing connector 136.

Towed sensor 126 sends received signals over communications connection 120 to motor controller 116 on UAV 102. Communications connection 120 might be wired 122 or wireless 124. A wireless connection 124 might comprise a mobile wireless connection or a disrupted wireless connection.

UAV 102 and towed sensor 126 communicate with communications nexus 140. Communications nexus 140 might be a ground station, another UAV, an airplane, or some type of "mother ship" (i.e., balloon, blimp, etc.). Communications nexus 140 includes receiver 142 that receives signal transmission 114 from UAV 102. Transmitter 144 transmits signals that are detected by signal receiver 128 of the towed sensor 126.

Figure 2:
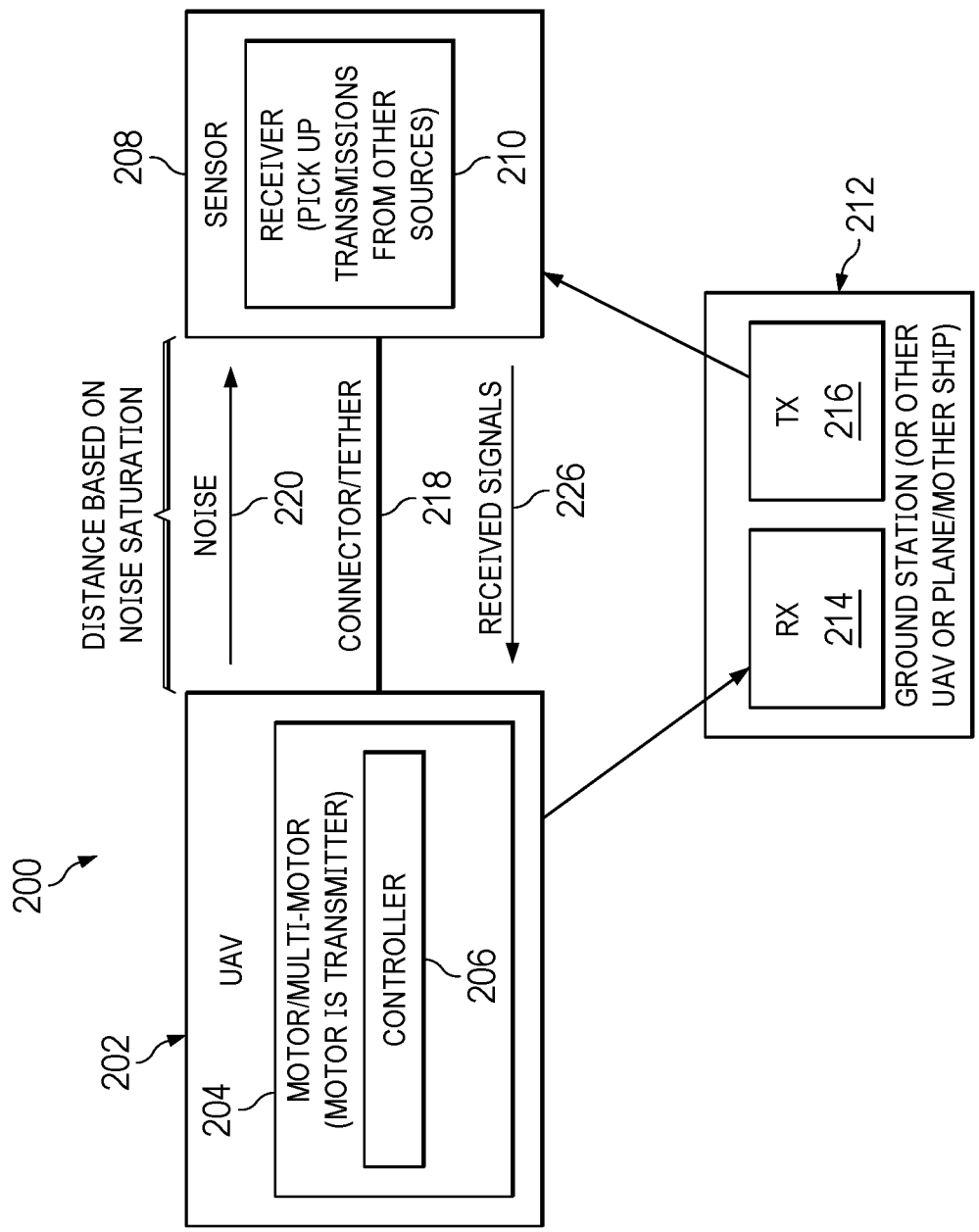
FIG. 2 depicts an implementation of a UAV secondary communication system in accordance with an illustrative embodiment.

FIG. 2 depicts an implementation of a UAV secondary communication system in accordance with an illustrative embodiment. UAV secondary communication system 200 is an example implementation of UAV secondary communication system 100 in FIG. 1.

UAV 202 tows sensor 208 via connector/tether 218. The length of the connector/tether 218 is determined according to the distance sufficient to prevent noise saturation (whether audio or magnetic) by motor(s) 204 that would hinder the receiver 210 from detecting transmissions. UAV secondary communication system 200 takes advantage of the inverse-cube law wherein the strength of noise 220 generated by the UAV motor 204 is inversely proportional to the cube of the distance.

Figure 4:
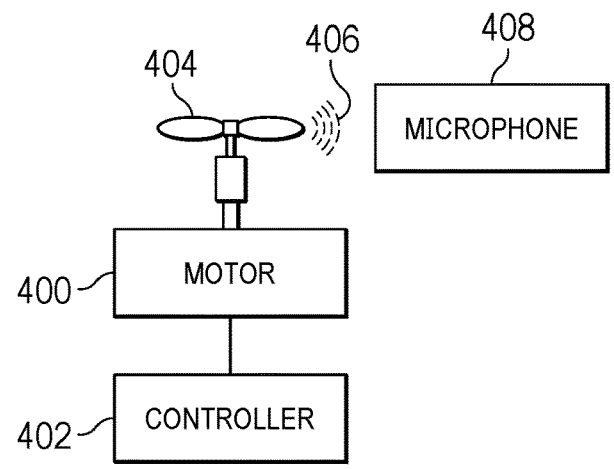
FIG. 4 is a pictorial diagram illustrating motor modulation to generate signals from motor noise in accordance with an illustrative embodiment.

The motor (or motors) 204 on UAV 202 act as one or more transmitters via modulation by controller 206 (see FIG. 4). In the present example, transmissions 222 (audio or magnetic) emanating from UAV 202 are received by a receiver 214 at ground station 212 (which alternatively might be another UAV or plane/mother ship). The ground station 212, in turn, uses transmitter 216 to send transmission 224, which receiver 210 is able to detect due to its distance from UAV 202 to avoid local noise interference.

Received signals 226 might be audio or magnetic in nature like signal transmissions from the UAV 202 and are passed from the sensor 208 to the UAV 202 via wired or wireless connection where they are decoded by the controller 206.

Figure 3:
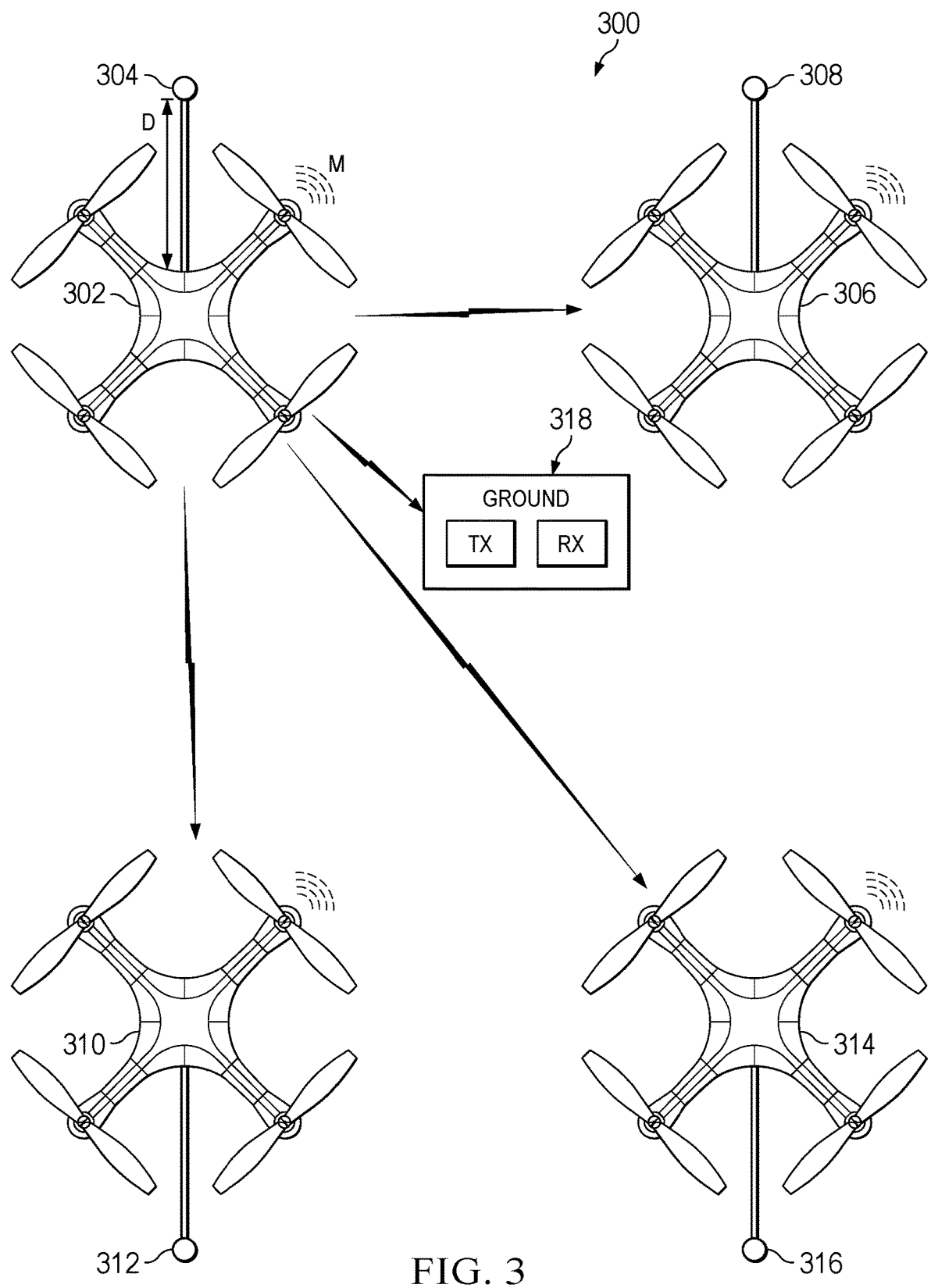
FIG. 3 is a pictorial representation of a coordinated array of UAVs in accordance with an illustrative embodiment.

FIG. 3 is a pictorial representation of a coordinated array of UAVs in accordance with an illustrative embodiment. Array 300 includes a number of UAVs 302, 306, 310, 314, which are examples of UAV 102 in FIG. 1 and UAV 202 in FIG. 2. In the present example, array 300 also includes a ground station 318 in communication with the UAVs 302, 306, 310, 314. Although FIG. 3 depicts four UAVs, the actual number can be greater or fewer than four without requiring undue experimentation and remaining in accordance with the illustrative embodiment.

Each of the UAVs 302, 306, 310, 314 has a corresponding towed sensor 304, 308, 312, 316. A mechanical fixture d places the towed sensors 304, 308, 312, 316 far enough away from the rotors of the motors on UAVs 302, 306, 310, 314 to allow detection of incoming communication signals without interference of those signals by noise generated by the UAV motors. M is a modulated signal emission from UAV 302 that is detected by the other UAVs 306, 310, 314 and ground station 318.

FIG. 4 is a pictorial diagram illustrating motor modulation to generate signals from motor noise in accordance with an illustrative embodiment. In the present example, motor 400 is an electric motor for a UAV such as UAV 102 in FIG. 1 and UAV 202 in FIG. 2. Although a single motor 400 is shown in FIG. 4, it should be noted that it is possible to have a plurality of motors and still be in accordance with the illustrative embodiments.

The motor modulations shown in FIG. 4 leverage electric propulsion noise for location data by reusing sensors and actuators that are already present on a UAV. Controller 402 makes small (e.g., 5-10%) modulations of the rotation of rotors 404 of motor 400 to encode a signal 406 on the resulting audio output of the motor. This signal 406 is detected by microphone 408. Alternatively, controller 402 can modulate motor 400 to encode signals on the resulting magnetic output of the motor. Because electric motors have less lag than other propulsion systems such as air compression engines, the controller 402 can rapidly modulate the output of motor 400. For example, if a 2-phase brush motor spins at 10,000 rpm, a 10% difference in digital pulse width is 1000 rpm. The voltage frequency of a 2-phase brush motor is 2*modulation frequency, wherein the modulation frequency is 60*10,000 rpm*10%=60 kHz. This signal is beyond the audio range but is recordable by a magnetometer. At lower frequencies within the audible range, the difference in frequency is distinguishable by human hearing and microphones.

The data sent via modulation of the motor 400 identifies the UAV and provides a unique message requirement. Communication at kHz bands is often limited to a few hundred bits per second (bps). The data is sent using carrier modulation (e.g., frequency shift keying, minimum shift keying, etc.) that combines frequency and amplitude modulation of the transmitted signal. Such modulation is achieved by controlling the spin of the motor 400. For digital motor modulation, the pitch between on/off signals that drive the motor can be varied. For analog style motor modulation, the AC pulse of the motor is controlled using frequency, voltage ramp, voltage overshoot, and percentage on/off (or pitch) modulation. These electrical signals sent are controlled for each motor, allowing multiple motors to operate using the same function, or to be modulated independently.

In the case of multiple motors with respective corresponding motor controllers, independent modulation creates an overall measurable effect based on the linear summation of individual signals. Thus, signals sent can either constructively or destructively interfere to create more signal complexity. However, each sensor only reads within its allowable (or defined) channel bandwidth.

By using audio sensors, the illustrative embodiments can enhance the cyber resilience of existing location broadcast services used in aviation such as automatic dependent surveillance-broadcast (ADS-B). By encoding identity and position information through motor modulation, the illustrative embodiments provide a solution to the problem of location spoofing. For example, the motor controller 116 can modulate motor 104 to embed a position confirmation signal in the modulated noise transmission 114 output by the motor 104. In this manner, motor modulation can generate a confirmation signal that is separate and distinct from an ADS-B position signal. Such a confirmation signal can be continually recorded in a loop. Periodically, location information can be analyzed over a desired window of data. If the confirmation signal differs from the ADS-B signal, the receiving system can generate an alert that the ADS-B signal is not accurate and might have been spoofed.

In addition to reading location and identification information from a confirmation signal, tracking control can also analyze the physical characteristics of the carrier signal to approximate a location of the UAV in question, which limits the ability of an untrusted sender to spoof a location.

Figure 5:
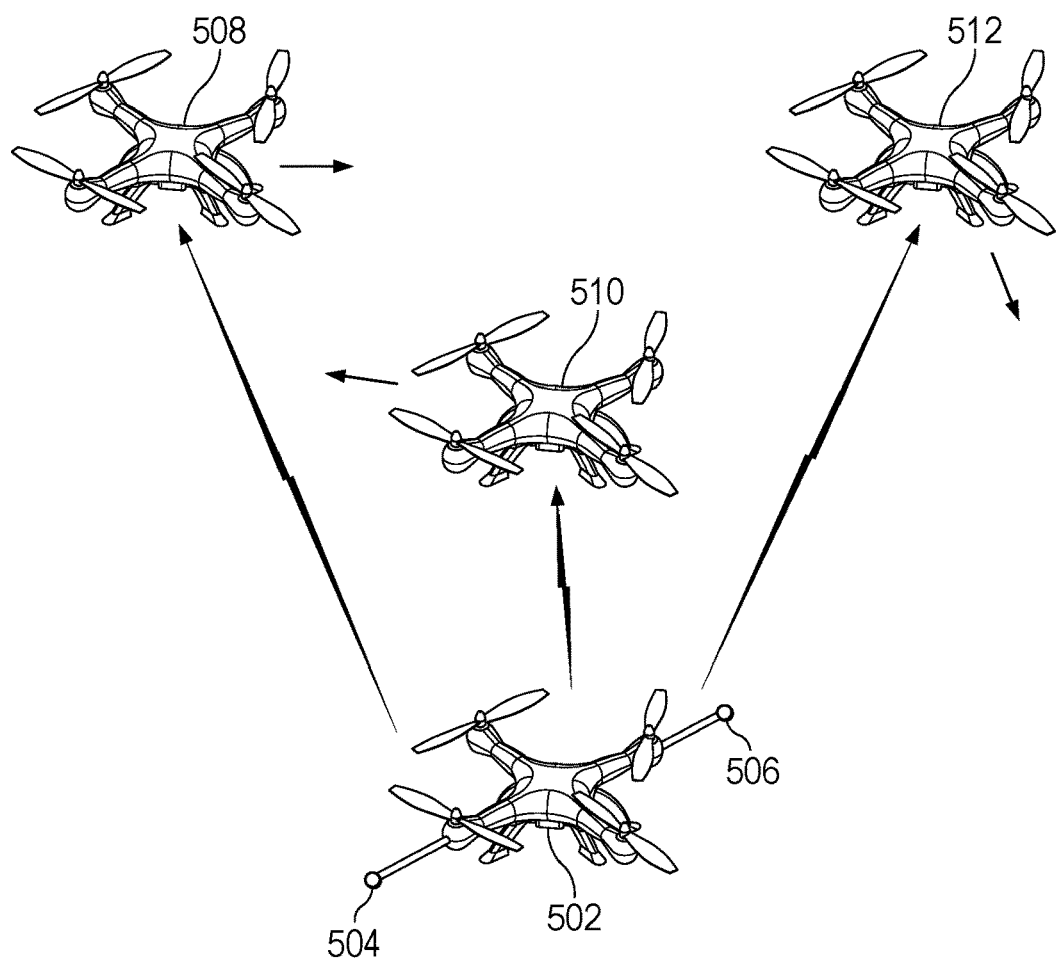
FIG. 5 is a pictorial diagram illustrating retrospective inspection of recorded audio data in accordance with an illustrative embodiment.

FIG. 5 is a pictorial diagram illustrating retrospective inspection of recorded audio data in accordance with an illustrative embodiment. In the present example, UAVs 502, 508, 510, 512 comprise multi-rotor (multi-copter) drones. Although FIG. 5 depicts four UAVs, the actual number can be greater or fewer than four without requiring undue experimentation and remaining in accordance with the illustrative embodiment.

Audio signals containing location and identification data are repeatedly recorded between the UAVs 502, 508, 510, 512 in a loop. When UAV 502 needs to analyze location of the other UAVs 508, 510, 512, that window of data can be processed. If UAV 502 is the master UAV, the other UAVs 508, 510, 512 will locate with respect to UAV 502. In the present example, UAV 502 includes multiple sensors 504, 506 that locate the other UAVs 508, 510, 512. Any UAV can serve as the master UAV with the correct software assignment.

To handle crowded environments, additional sensors can be added to UAV 502, each of which is more directional in nature. These additional directional sensors enhance the ability of UAV 502 to pick out and identify specific platforms (UAVs) to locate. Single sensors will only allocate distance data. In contrast, a sensor array can be used for direction finding to assign distance and direction that provides the master UAV 502 with a two-dimensional (2D) or three-dimensional (3D) map of the other UAVs 508, 510, 512.

In the case where some UAVs have multi-sensor arrays and other UAVs have a single sensor it is advantageous for the UAVs with the multi-sensor arrays to serve as the masters to compile geometric locality and perform related command and control functions back to a base (e.g., communications nexus 140).

Location information can be anchored according to the physics of the carrier signal. For example, the sensing UAV 502 not only reads the location and ID from the carrier signal, it can also use the physical characteristics of the carrier (audio) signal to approximate the location of the sensed UAV (e.g., UAV 510). As a consequence, even an untrusted sender is limited in its ability to spoof its location. In a crowd-sourced variant, that limitation is even more stringent.

Figure 6:
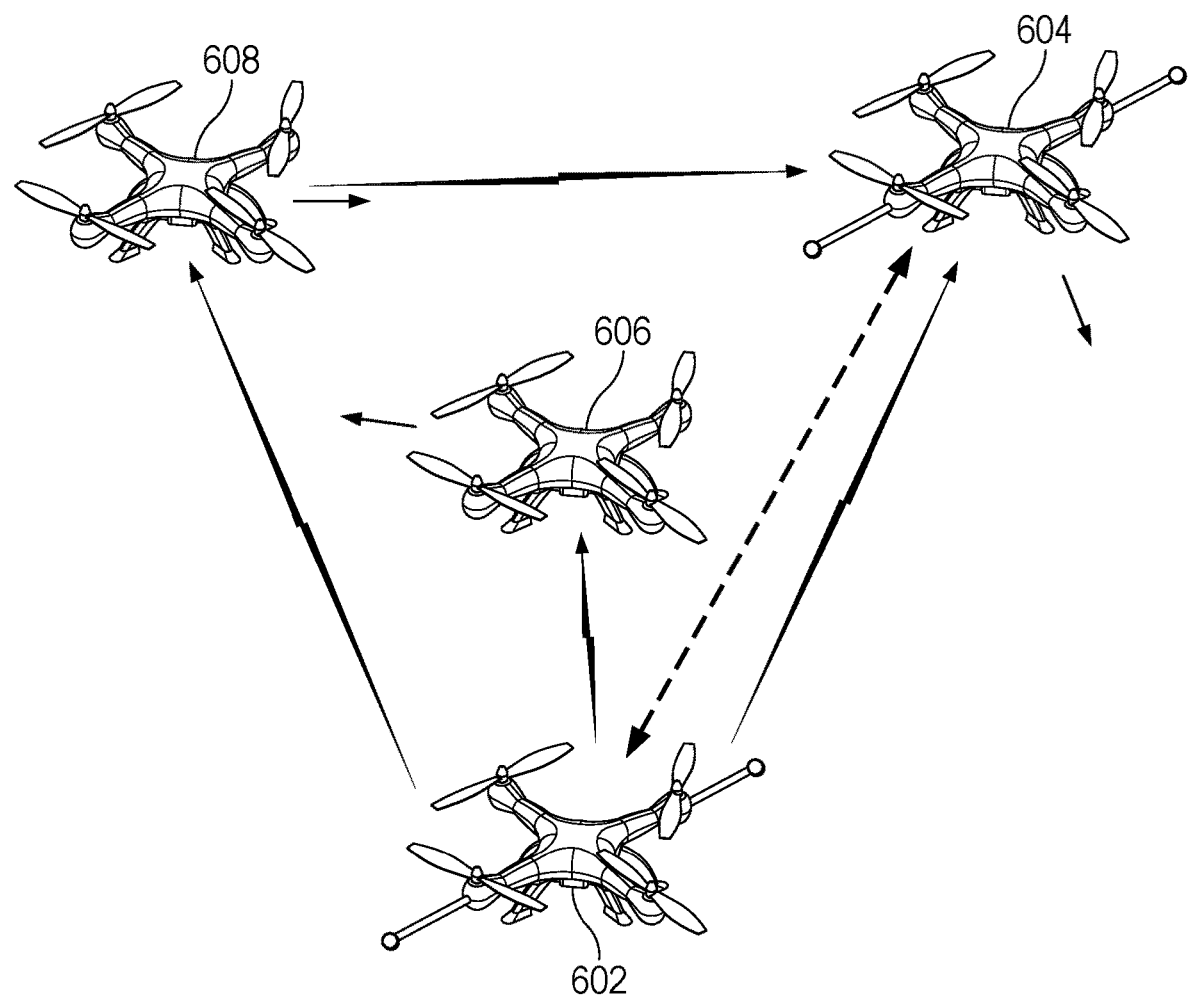
FIG. 6 is a pictorial diagram illustrating crowd sourcing of data in accordance with an illustrative embodiment.

FIG. 6 is a pictorial diagram illustrating crowd sourcing of data in accordance with an illustrative embodiment. Crowd sourcing can be used to increase resiliency and accuracy of location data.

In this application, are shown UAVs 602, 604 sharing their bounded location estimates. This sharing (federating) of location estimates improves their collective resistance to spoofing attempts and increases accuracy. UAVs 602, 604 might form part of a web of trust that also includes UAVs 606 and 608 (as well as additional UAVs not shown) in which each member is aware of corresponding identification keys of the other members. Exchange of the identification keys might take place via transceivers on respective UAVs using a close-range communication protocol.

The web of trust is initialized after each UAV has exchanged a respective sensor-specific identification key with every other UAV in the group. Once the web of trust is initialized, the UAVs 602, 604, 606, 608 can conduct missions that require real-time verification of data.

Figure 7:
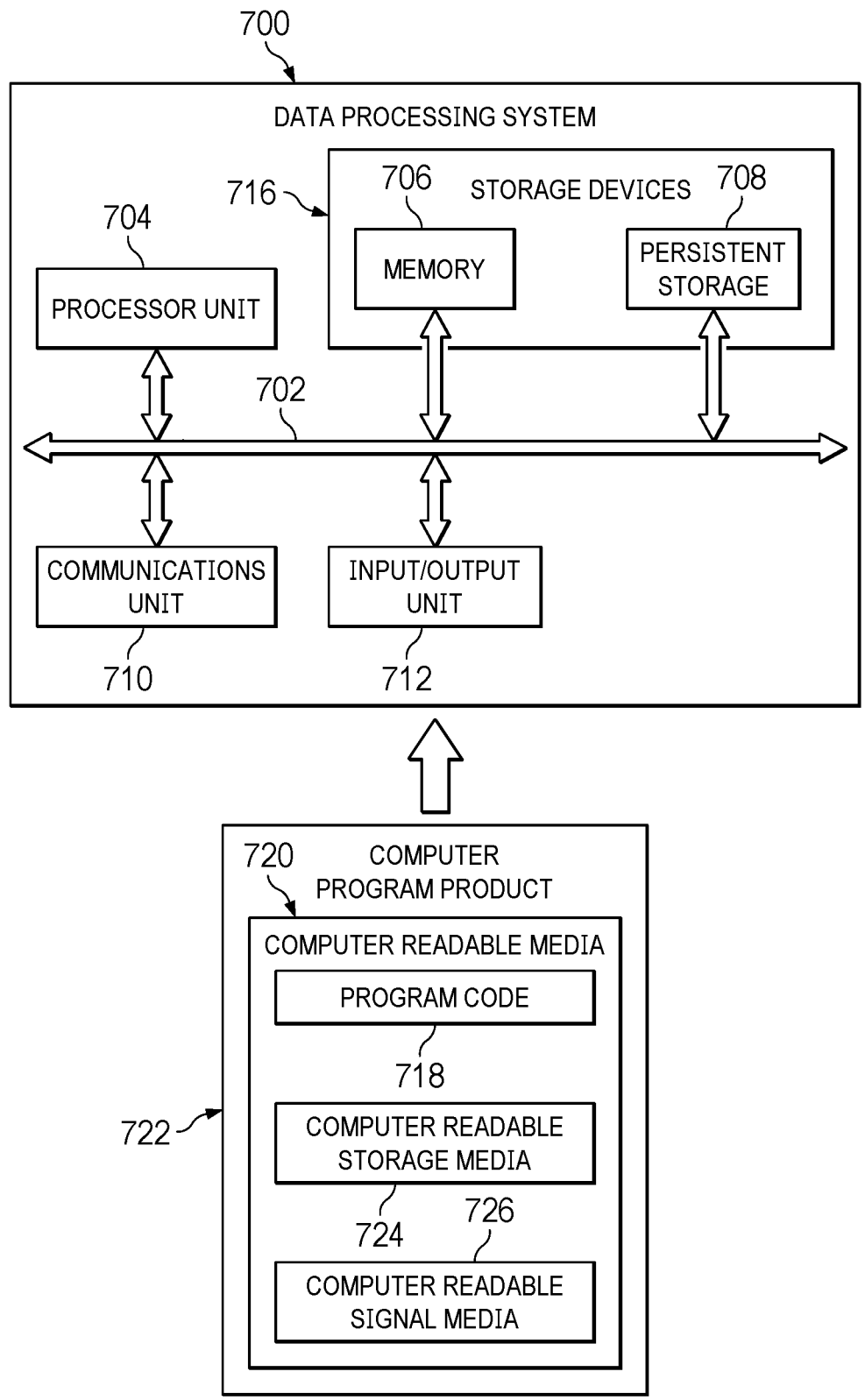
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be an example of motor controller 116 in FIG. 1 and/or controller 206 in FIG. 2. In this illustrative example, data processing system 700 includes communications framework 702, which provides communications between processor unit 704, memory 706, persistent storage 708, communications unit 710, and input/output (I/O) unit 712. In this illustrative example, communications framework 702 takes the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. Persistent storage 708 may store program code. Such program code might include including neuromorphic or other artificial intelligence-based filtering software algorithm to improve signal resolution over defined channels in cases where the signal to noise ratio (SNR) would otherwise render the communication approach ineffective. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

When one component is "connected" to another component, the connection is a physical connection. For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A towed sensor assembly, comprising:
   a connector configured to connect a towed sensor to an unmanned aerial vehicle (UAV); and
   the towed sensor that acts as a receiver for the UAV, wherein the sensor receives a signal from a transmission source other than the UAV, and wherein the sensor is towed on the connector at a distance from the UAV sufficient to prevent or minimize interference of the received signal by noise generated by at least one motor on the UAV.

2. The towed sensor assembly of claim 1, wherein the received signal from the transmission source and the noise generated by the motor on the UAV are both audio in nature.

3. The towed sensor assembly of claim 1, wherein the received signal from the transmission source and the noise generated by the motor on the UAV are both magnetic in nature.

4. The towed sensor assembly of claim 1, wherein the sensor sends the received signal to the UAV for decoding.

5. The towed sensor assembly of claim 1, further comprising active control surfaces to guide the towed sensor in flight.

6. The towed sensor assembly of claim 1, wherein the transmission source is at least one of:
   a ground station;
   a second UAV; or
   an aircraft.

7. The towed sensor assembly of claim 1, wherein the UAV comprises one of:
   an aerial drone; or
   a multi-copter drone.

8. The towed sensor assembly of claim 1, wherein the towed sensor communicates with the UAV over one of:
   a wired connection; or
   a wireless connection.

9. A secondary communication system for an unmanned aerial vehicle (UAV), the secondary communication system comprising:
   at least one motor on the UAV;
   a motor controller in each of the at least one motor that generates a signal from noise generated by the at least one motor;
   a connector configured to connect a towed sensor to the UAV; and
   the towed sensor that acts as a receiver for the UAV, wherein the sensor receives a signal from a transmission source other than the UAV, and wherein the sensor is towed on the connector at a distance from the UAV sufficient to prevent or minimize interference of the received signal by the noise generated by the at least one motor.

10. The secondary communication system of claim 9, wherein the received signal from the transmission source and the noise generated by the motor on the UAV are both audio in nature.

11. The secondary communication system of claim 9, wherein the received signal from the transmission source and the noise generated by the motor on the UAV are both magnetic in nature.

12. The secondary communication system of claim 9, wherein the sensor sends the received signals to the UAV for decoding by a signal processor.

13. The secondary communication system of claim 9, further comprising active control surfaces to guide the towed sensor in flight.

14. The secondary communication system of claim 9, wherein the transmission source is at least one of:
    a ground station;
    a second UAV; or
    an aircraft.

15. The secondary communication system of claim 9, wherein the UAV comprises one of:
    an aerial drone; or
    a multi-copter drone.

16. The secondary communication system of claim 9, wherein the towed sensor communicates with the UAV over one of:
    a wired connection; or
    a wireless connection.

17. The secondary communication system of claim 9, wherein the at least one motor further comprises multiple motors, each with a respective corresponding motor controller.

18. The secondary communication system of claim 17, wherein each of the multiple motors operates at different respective frequencies from the other or others of the multiple motors.

19. The secondary communication system of claim 17, wherein the multiple motors are synchronized with each other.

20. A method of secondary communication for an unmanned aerial vehicle (UAV), the method comprising:
    generating, by a motor controller in at least one motor of the UAV, a signal from noise generated by the at least one motor, wherein the noise generated by the at least one motor is magnetic or audio in nature; and
    receiving, by a sensor towed by the UAV, a signal from a transmission source other than the UAV, wherein the sensor is towed at a distance from the UAV sufficient to prevent or minimize interference of the received signal by the noise generated by the at least one motor, and wherein the received signal from the transmission source is magnetic or audio in nature.

* * * * *